(No Model.)
W. BATES.
WINDMILL.
No. 545,045. Patented Aug. 27, 1895.
2 Sheets—Sheet 1.
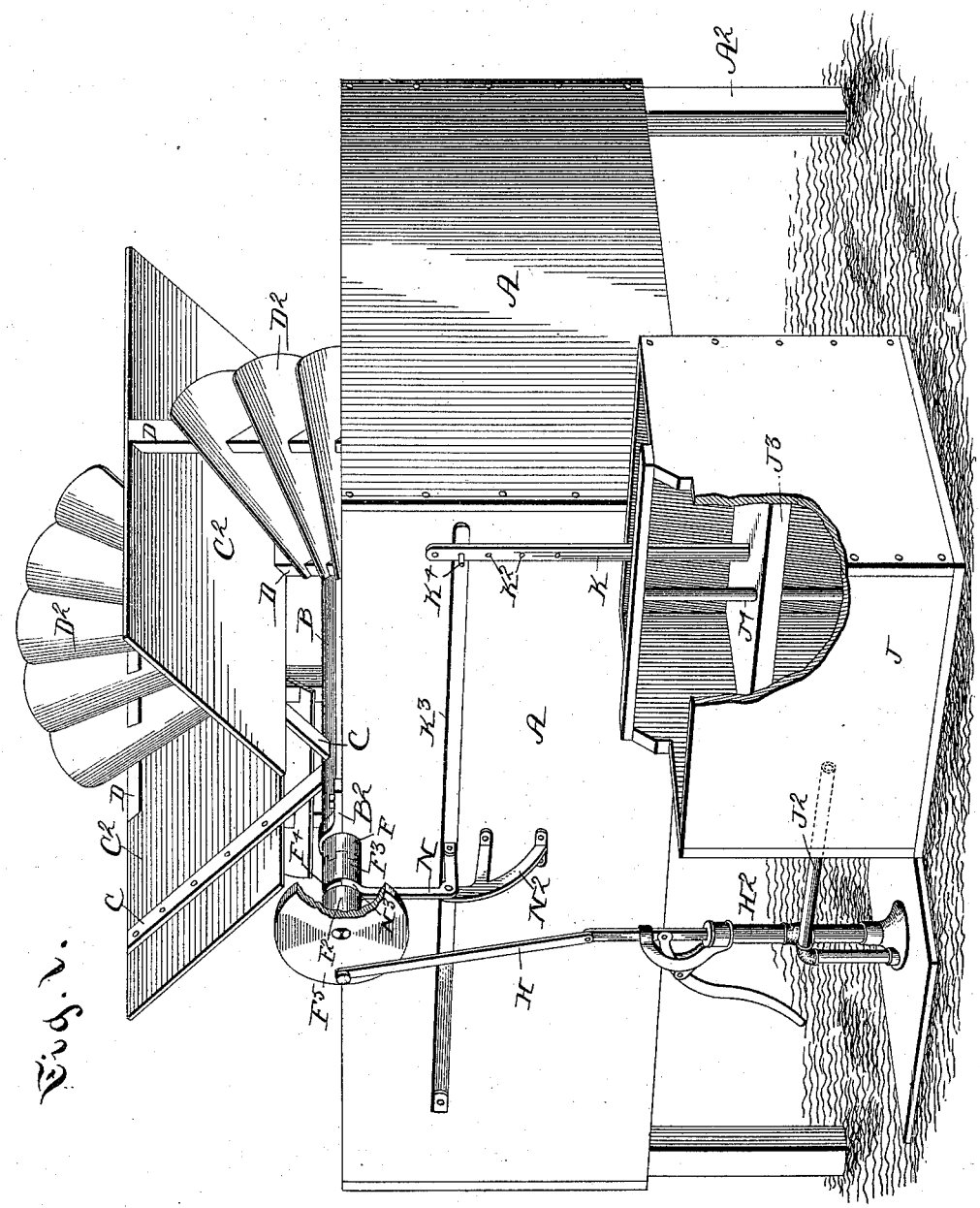
Witnesses:
W. J. Sankey
R. G. Orwig
Inventor: Walter Bates,
By Thomas G. and J. R. Orwig, Attorneys.

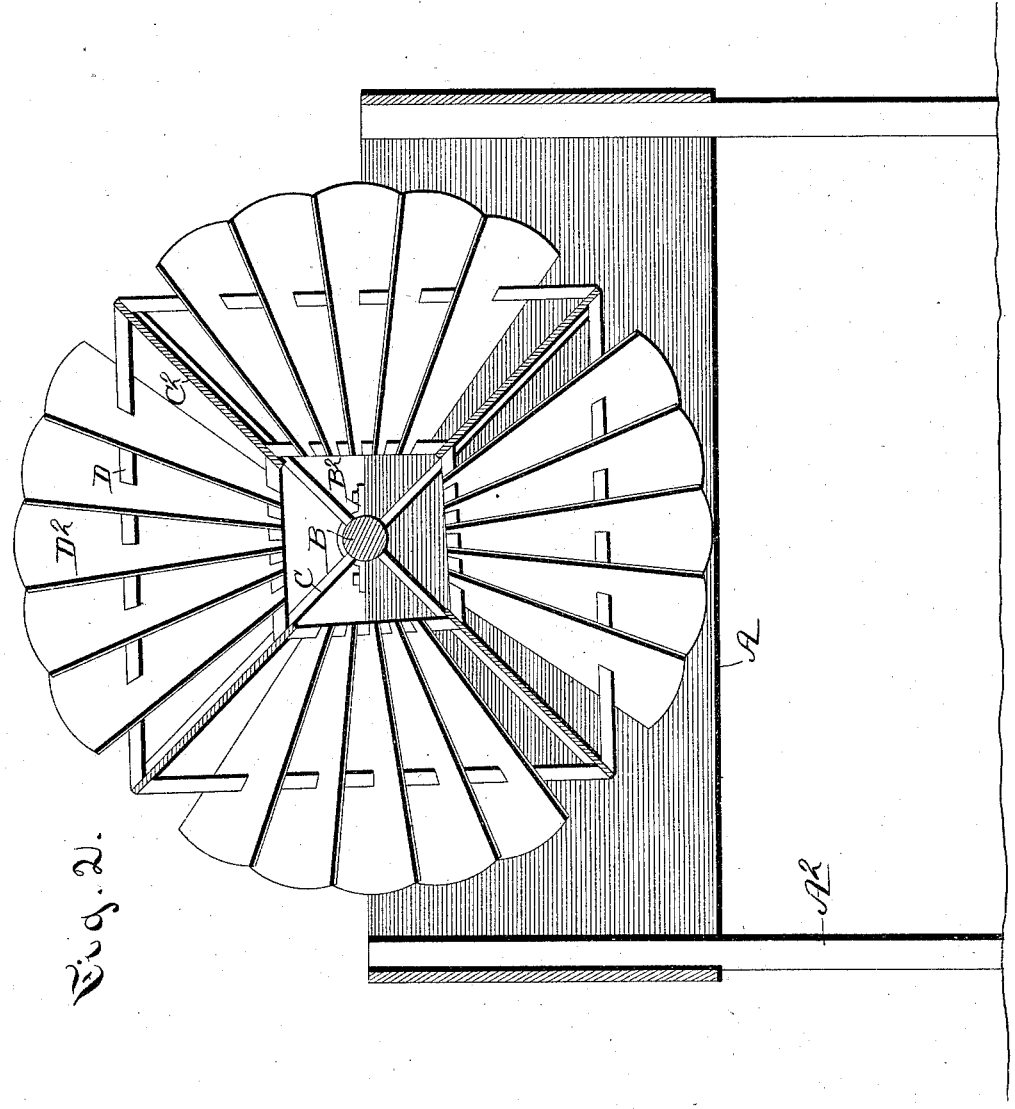

ered therewith and with a pump $H^2$.
UNITED STATES PATENT OFFICE.

WALTER BATES, OF COLLINS, IOWA.

WINDMILL.

SPECIFICATION forming part of Letters Patent No. 545,045, dated August 27, 1895.

Application filed April 5, 1895. Serial No. 544,686. (No model.)

*To all whom it may concern:*

Be it known that I, WALTER BATES, a citizen of the United States of America, residing at Collins, in the county of Story and State of Iowa, have invented a new and useful Windmill, of which the following is a specification.

My object is to provide a strong, durable, and efficient windmill that requires no adjustment relative to the direction of the wind, and also to provide means for covering portions of the wheel to regulate the force of the wind that comes in contact with the wheel as required to prevent damage to the wheel in a storm and to regulate the speed of the wheel.

My invention consists in the construction, arrangement, and combination of parts, as hereinafter set forth, pointed out in my claims, and illustrated in the accompanying drawings, in which—

Figure 1 shows the complete mill in perspective. Fig. 2 is a vertical sectional view of the same.

Referring to the accompanying drawings, the reference-letter A is used to indicate a rectangular frame with solid sides and supported in a horizontal position by the uprights $A^2$ at its corners.

B indicates a horizontal shaft rotatably mounted in suitable bearings $B^2$ in the top of the frame A. Fixed to this shaft are a series of radial arms C, and $C^2$ indicate broad paddles fixed to said arms extending radially from the shaft and parallel therewith.

D D indicate braces connecting the central portions of the paddles $C^2$ at the inner and outer edges, and $D^2$ are a series of feathered blades connected with said braces and extended radially from the shaft B. With this construction of wind-wheel it is obvious that if the wind blows from a point at right angles to the shaft B or any point within a quarter circle in either direction from said point the wheel will be rotated by pressure upon the paddles $C^2$, inasmuch as the lower half of the wheel is protected by the frame A and the wind can only engage the top blades, and if the wind blows from a point parallel with the shaft or any angle near said point, the wheel will be rotated by pressure upon the feathered blades $D^2$, and when the wind blows from either quarter both sets of blades will aid in rotating the wheel.

F indicates a clutch device on one end of the shaft B, and $F^2$ a sliding collar on the shaft having a mating-clutch device $F^3$ on its inner end, an annular groove $F^4$ near its central portion, and a crank-wheel $F^5$ on its outer end. This crank-wheel has a pitman-rod H connected therewith and with a pump $H^2$.

J indicates a suitable water-containing tank supplied by a pipe $J^2$ leading thereinto from said pump. $J^3$ indicates a float in said tank guided vertically by means of the rod $J^4$.

K indicates a bar connected with the float and having a series of perforations $K^2$ in its upper end. A lever $K^3$ is pivoted at one end to the frame A, and its other end is adjustably connected with the bar K by means of a pin $K^4$.

Means are provided for throwing the clutch device out of gear when the water in the tank reaches a certain predetermined height as follows: N indicates a bell-crank lever mounted in a bracket $N^2$ secured to the frame A. One end of the lever has a fork $N^3$ adapted to enter the annular groove $F^4$ in the collar $F^2$, and the other end is pivoted to the levers $K^3$. Thus when the lever is elevated the clutch device is separated, and vice versa.

The wheel rotates freely upon any movement of the wind, and all the expensive and complicated mechanism for holding the wheel to the wind and starting and stopping it is done away with.

Having thus described my invention, what I claim as new therein, and desire to secure by Letters Patent of the United States therefor, is—

1. In an improved wind wheel the combination with a rotatable shaft, of a series of blades parallel with the shaft, and a series of radial feathered blades and means for protecting part of the wheel from wind pressure, for the purposes stated.

2. An improved wind wheel, comprising a rotatable axle, a series of radial arms fixed thereto, paddles fixed to the radial arms parallel with the axle, braces between said paddles, a series of feathered blades secured to said braces between the paddles, and a wind brake surrounding the lower portion of the wheel, for the purposes stated.

WALTER BATES.

Witnesses:
J. W. FOLLER,
ANDREW STEVENS.